United States Patent [19]

Sandstrom et al.

[11] Patent Number: 5,341,863

[45] Date of Patent: Aug. 30, 1994

[54] TIRE WITH TREAD COMPOSITION

[75] Inventors: Paul H. Sandstrom, Tallmadge; Raymond B. Roennau, Stow, both of Ohio

[73] Assignee: The Goodyear Tire & Rubber Company, Akron, Ohio

[21] Appl. No.: 62,263

[22] Filed: May 17, 1993

[51] Int. Cl.5 .......................... C08L 7/00; C08L 9/00; C08L 23/06

[52] U.S. Cl. ................... 152/209 R; 525/192; 525/232; 525/236; 525/237

[58] Field of Search .................. 152/209 R; 156/128.1; 525/232, 236, 237, 192

[56] References Cited

U.S. PATENT DOCUMENTS 4,624,296 11/1986 Takiguchi ........................... 152/564

FOREIGN PATENT DOCUMENTS 821846 10/1959 United Kingdom ................ 525/232

1105118 3/1968 United Kingdom ................ 525/232

*Primary Examiner*—David Buttner
*Attorney, Agent, or Firm*—Henry C. Young, Jr.

[57] ABSTRACT

A pneumatic tire having a sulfur cured tread is provided comprised of at least one diene rubber and a low density polyethylene having a crystalline melt point in a range of about 104° C. to about 115° C., wherein the said LDPE is mixed with the said rubber at a temperature of about 120° C. to about 170° C. prior to sulfur vulcanizing the blend.

A process is also provided for producing a tire in which a hot cured tire is removed from its rigid mold where the tread is comprised of at least one diene rubber and a low density polyethylene (LDPE) having a crystalline melt point in a range of about 104° C. to about 115° C.; and wherein the said LDPE is mixed with the said unvulcanized rubber at a temperature of about 120° C. to about 170° C.

5 Claims, No Drawings

TIRE WITH TREAD COMPOSITION

FIELD

This invention relates to pneumatic tires which have treads of sulfur cured rubber which contains a minor amount of low density polyethylene.

BACKGROUND

Pneumatic rubber tires for vehicular use conventionally have sulfur cured rubber treads. Such treads are typically composed of one or more sulfur curable, diene rubber-based elastomers.

Typically, quantitative inclusion of saturated, non-elastomeric, thermoplastic polymers in the diene rubber-based sulfur curable rubber treads is avoided, primarily because such saturated, thermoplastic polymers do not have sulfur cure sites and, thus, create uncured areas in the cured rubber tire treads which might degrade one or more desirable tire properties such as, for example, resilience, low heat buildup and resistance to permanent set.

It is recognized that, in one aspect, tire treads containing high density polyethylene, characterized by having a softening point above 275° F. (135° C.) has been taught for use as an additive (2–20 phr) in a tread cap designed to contact the road (U.S. Pat. No. 4,675,349), where the high density polyethylene is mixed at a temperature of about 200°–240° F. (93°–116° C.), the mixing temperature "being insufficient to significantly alter the size and shape of the polyethylene particles . . . " at column 6, line 32–34 of the aforesaid U.S. patent. The use of such a high density polyethylene is said to provide a tire with a "good balance of rolling resistance, skid resistance, wear and handling".

However, it is considered that, for some applications, it is not entirely desirable to use a blend of rubber and high density polyethylene.

DISCLOSURE AND PRACTICE OF THE INVENTION

In accordance with this invention, a pneumatic rubber tire is provided having a sulfur cured, diene rubber-based tread which is comprised of a blend, based on 100 parts by weight sulfur curable diene rubber-based elastomers, of (A) 100 parts by weight of at least one sulfur vulcanizable diene based rubber, and (B) about 2.5 to about 20, preferably about 5 to about 15, parts by weight low density polyethylene (LDPE) having a crystalline melt point in a range of about 104° C. to about 115° C.; wherein the said LDPE is mixed with the said rubber at a temperature of about 120° C. to about 170° C. prior to sulfur vullcanizing the blend.

In one aspect, the tread rubber can be 100 phr natural cis 1,4-polyisoprene rubber.

In another aspect, the tire tread rubber is comprised of, based on 100 parts by weight rubber, about 55 to about 90 phr of natural cis 1,4-polyisoprene rubber and, correspondingly, about 45 to about 10 phr of at least one synthetic rubber selected from polybutadiene rubber and styrene/butadiene copolymer rubber.

In a further aspect, the tire tread rubber is comprised of, based on 100 parts by weight rubber, about 10 to about 90 phr of cis 1,4-polybutadiene rubber and, correspondingly, about 90 to about 10 phr of styrene/butadiene copolymer rubber.

It is also preferred, as an important aspect of the invention, that the extrudability of the compounded rubber composition, in an uncured state, be characterized by having an edge value in a range of about 7 to about 10 and a surface value in a range of about A to about B according to ASTM Method D-2230, using ASTM die #1 (Garvey type) with results reported according to Rating System B. This is considered important because lesser values indicate the likelihood of significant difficulty in producing useable rubber articles by extrusion or other conventional processes.

It is considered herein that the inclusion of the LDPE in the tread rubber composition contributes to and enhances such extrudability characteristics.

In the practice of this invention, the LDPE is mixed with the rubber at a temperature above its crystalline melt temperature. This is considered an important aspect of the invention which relies on the difference between the aforesaid temperatures which is considered herein to cause the LDPE to become a viscous fluid and to, thus, effect a relatively homogeneous blending, or distribution, of small particle size LDPE within the rubber composition during the LDPE/rubber mixing stage. This effect is considered to be beneficial in enhancing the ultimate sulfur cured rubber composition's resistance to tear initiation (cutting) and, also, its resistance to tear propagation.

The rubber composition's enhanced resistance to tear initiation and propagation is considered beneficial, for example, in the releasing, or removing, of an intricate molded article, such as for example, a tire tread with particularly deep grooves and high lugs, from its hot mold immediately upon vulcanizing the article in the mold.

Thus, in further accordance with this invention, in a process for producing a tire in which an unvulcanized rubber tire is vulcanized in a rigid mold under pressure and at an elevated temperature in a range of about 120° C. to 170 ° C. to form a tire with a circumferential rubber tread configured with lugs and grooves, followed by removing the tire from the rigid mold at a tire temperature of about 100° to about 150° C., an improvement wherein such tire tread is comprised of a blend, based on 100 parts by weight sulfur curable diene rubber-based elastomers, of (A) 100 parts by weight of at least one sulfur vulcanizable diene based rubber, and (B) about 2.5 to about 20, preferably about 5 to about 15, parts by weight low density polyethylene (LDPE) having a crystalline melt point in a range of about 104° C. to about 115° C.; and wherein the said LDPE is mixed with the said unvulcanized rubber at a temperature of about 120° C. to about 170° C.

Such process of vulcanizing a tire is very important in that it is considered herein that the tendency of a tire tread, which has a configuration of lugs and grooves, to tear upon being removed from a mold while the tire is still hot from the vulcanization process is substantially reduced due to the presence of the aforesaid LDPE which was mixed with the tread rubber by the aforesaid process, namely, at the aforesaid temperature range.

Accordingly, a tire prepared by such process is contemplated by this invention.

In practice, the LDPE would be conventionally mixed with the rubber in one or more non-productive mix steps at the temperature of 120° C. to 170° C. following which the curatives would be added in a productive mix step at a lower temperature. The processing and mixing of the rubber composition via non-productive and productive mix steps is well known to those having skill in the rubber mixing art.

In practice, it is considered that at the temperatures normally used in the productive mix step, or stage, (110° C.–130° C.), the LDPE is sufficiently softened (e.g.: has a crystalline melt point at about or less than such mix temperature) so that it does not adversely affect the mixture's processing characteristics by causing the mixture to be too stiff or too viscous for conventional processing aspects.

The low-density polyethylene (LDPE) preferred for this invention is typically characterized by having a crystalline melt point of about 104° C. to about 115° C., and usually a density of about 0.91 to about 0.93 gm/cc. It may have a melt index of, for example, about 0.2 to about 20 or possibly higher.

The crystalline melt point can be determined by ASTM Method No. D-2117.

The density can be determined by ASTM Method No. D-792.

The melt index can be determined by ASTM Method No. D-1238.

Various sulfur curable diene based rubbers can be used for the tread rubber for this invention, representative of which are, although not limited to, natural or synthetic cis 1,4-polyisoprene rubber, and synthetic diene based styrene/butadiene copolymer rubber and cis 1,4-polybutadiene rubber.

Preferably the rubber is natural rubber (natural cis 1,4-polyisoprene) or, based on 100 parts by weight rubber, about 50 to about 100 parts by weight (phr) natural rubber and, correspondingly, about zero to about 50 phr of synthetic diene based rubber.

Thus, preferably, the rubber composition contains a majority of natural rubber.

If a synthetic diene rubber is to be used, then a preferable blend comprises about 55 to about 90 phr natural rubber and, correspondingly, about 45 to about 10 phr synthetic diene based rubber, particularly the aforesaid exemplary diene based rubbers.

The rubber(s) and LDPE can be mixed together by conventional rubber composition mixing processes.

For example, rubber compositions (rubber plus compounding ingredients) are conventionally mixed in two or more stages, namely, one or more initial "nonproductive" mixing stages followed by a productive mix stage. The curatives are conventionally added in what is usually the final "productive" stage. In the nonproductive mix stage(s), the rubber and various ingredients such as carbon black, etc., are conventionally mixed at temperatures in a range of 120° C. to 170° C. The curatives are conventionally mixed in the following productive mix stage at temperatures in a range of about 110° C. to 130° C. The mixing of rubber compositions in the aforesaid non-productive and productive mix stages, or steps, at the aforesaid associated mixing temperature ranges is well known to those having skill in the rubber composition mixing art.

In the practice of this invention, the LDPE is mixed with the rubber, and other compounding ingredients, in a non-productive stage at a temperature in a range of about 120° C. to about 170° C. At such temperature, the LDPE, normally a solid at room temperature (23° C.) typically becomes a viscous fluid at such mixing temperature which is above its crystalline melt point. With the accompanying substantial shear forces associated with the rubber mixing in the non-productive mixing stage, the LDPE readily mixes with and disperses in the rubber composition to form a homogeneous mixture. Thus, it is important that the low density polyethylene is utilized with its associated properties of being fluid, or viscous, at the rubber composition mixing temperature. This is considered to be an important feature of the invention to enable the polyethylene to effectively disperse in the rubber in contrast to particles of high density polyethylene which are not expected to significantly deform upon mixing with the rubber composition in view of their melt point or softening point being above the rubber composition mixing temperature.

While the mechanism of the interaction of the LDPE with the vulcanized tread rubber may not be fully understood it is considered that the LDPE acts to intercept, interrupt or deflect fracture propagation, especially at relatively high temperatures near the softening point of the LDPE, as observed by increased resistance of the vulcanized rubber to cutting and tearing (tear initiation and tear propagation).

The enhanced resistance to tear initiation aided by the inclusion of the LDPE is important because it is considered that the tear of the cured rubber product begins with the tear (cut) initiation. The benefit can be expected, for example, in an enhanced resistance of a tire tread to cutting by broken glass or other road debris.

The enhanced resistance to tear propagation aided by the inclusion of the LDPE is considered important because after the tear is initiated, its propagation can potentially lead to premature failure of the rubber product.

Further, it is considered that the LDPE/rubber combination helps to increase tire tread life as evidenced by an observed increased abrasion resistance of the LDPE/rubber combination.

As a result, it is considered that an enhanced tire is provided because of enhanced resistance to tearing, cutting and, also, abrasion.

Further, the enhanced resistance to tearing can also be observed when removing a hot, cured (vulcanized) tire from a hot mold, particularly when the tire tread has exceptionally deep grooves and high lugs. It has also been observed, in some cases, to improve tear resistance of the vulcanized rubber composition as the rubber heats up in service.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, and plasticizer, fillers, pigments, fatty acid, zinc oxide, waxes, antioxidants and antiozonants, peptizing agents and reinforcing materials such as, for example, carbon black and silica. As known to those skilled in the art, depending on the intended use of the sulfur vulcanizable and sulfur vulcanized material (rubbers), the additives mentioned above are selected and commonly used in conventional amounts.

Typical additions of carbon black comprise about 5 to about 80, and sometimes more, parts by weight per 100 parts by weight of diene rubber (often abbreviated as phr), preferably about 5 to about 60 phr. Silica, if used, perhaps in conjunction with a coupler, might be added in amounts of 5 to 80 phr, with appropriate adjustment in amount of carbon black utilized so that the total of reinforcing carbon black and silica is a range of about 10 to about 80, also sometimes more might be desired. Typical amounts of tackifier resins, if used, comprise about 0.5 to about 10 phr, usually about 1 to about 5 phr. Typical amounts of processing aids comprise about 1 to about 20 phr. Such processing aids can include, for example, aromatic, napthenic and/or paraffinic processing oils. Typical amounts of antioxidants comprise about 0.5 to about 3 phr or more.

The presence and relative amounts of the above additives are not considered to be an aspect of the present invention which is more primarily directed to the utilization of specified blends of rubber and LDPE in tire treads.

A tire with its tread, can be built, shaped, molded and cured, or vulcanized, by various methods which are known or are readily apparent to those skilled in such art.

The invention is exemplified by the following Examples in which the parts and percentages are by weight, unless otherwise noted.

EXAMPLE I

A rubber blend is prepared of natural cis 1,4-polyisoprene rubber together with an LDPE by forming a mixture thereof comprised of the materials shown in the following Table 1. Experiment A (Exp A) is considered a Control without the LDPE and Experiment B (Exp B) is considered to be an example of this invention. Experiment C (Exp C) exemplifies the use of a high density polyethylene (HDPE).

TABLE 1

| Material | Parts | | |
|---|---|---|---|
| | Exp A (Control) | Exp B | Exp C |
| Natural rubber | 100 | 100 | 100 |
| LDPE[1] | 0 | 10 | 0 |
| HDPE[2] | 0 | 0 | 10 |
| Carbon Black (N-347 type) | 50 | 50 | 50 |
| Sulfur | 1.75 | 1.75 | 1.75 |

[1] An LDPE identified as Petrothene NA 940-000 and obtained from Quantum Chemical Corp. The LDPE reportedly has the following properties: a crystalline melt point of 104° C.-115° C., a density of 0.918 and a melt index of 0.25.
[2] A high density polyethylene (HDPE) identified as Petrothene LR 732-00 obtained from Quantum Chemical Corp. The HDPE reportedly has the following properties: a crystalline melt point of 125° C.-140° C., a density of 0.955 and a melt index of 0.30.

Conventional amounts of stearic acid, zinc oxide, antidegradants, process oil and accelerator(s) of the sulfenamide type were used.

The blends were prepared by mixing the rubber or rubber and LDPE, or HDPE, in a first, non-productive, mix stage at a temperature of about 130° C. to 170 ° C., together with the compounding ingredients other than the curatives followed by adding the curatives of sulfur, accelerator(s) and activator(s) in a productive mix stage at a temperature of about 110° C. to about 130° C.

the resulting blends were cured at a temperature of about 135° C. for about 140 minutes.

The cured blends were observed to have the properties shown in Table 2.

TABLE 2

| Property | Value | | |
|---|---|---|---|
| | Exp A (Control) | Exp B | Exp C |
| Tear Resistance at 120° C. (N) | 128 | 236 | 189 |
| Bridgestone pendulum cut depth (mm) | 13.1 | 12.2 | 10.8 |

TABLE 2-continued

| Property | Value | | |
|---|---|---|---|
| | Exp A (Control) | Exp B | Exp C |
| Hardness (Shore A) RT/100° C. | 60/57 | 63/57 | 67/61 |
| Abrasion (volume loss) | 128 | 116 | Not Tested |
| Mooney viscosity | 59 | 55 | 97 |
| Extrudability | 10/A | 10/A | 4/C |

The tear resistance test is conducted by curing two samples (149×149×2.4 mm each) of material together and pulling them apart at a 180° angle at about 23° C. at a rate of about 51 mm per minute and the results are reported herein in units of newtons force. A higher value is considered important because it indicates a higher resistance to tear propagation.

The Bridgestone pendulum cut depth test is conducted by positioning a 25×25×51 mm cured block of the material at the base of a Bridgestone Penetration Tester and the pendulum actuated at about 23° C. so that its sharpened blade is allowed to impinge upon the top of the block. The results are reported herein in units of millimeters of depth cut by the pendulum blade. A lower value is considered preferred as indicating a resistance to cutting, or tear initiation.

The Shore A hardness is according to ASTM No. D-2240. The test is a measure of hardness.

The abrasion test is according to DIN 53516 and the data is reported as volume loss relative to a standard. A lower value is considered important because it indicates a resistance to abrasive wear.

The Mooney Viscosity test is according to ASTMD-1646 and the data is reported in Mooney Units using the large rotor at 100° C. It is expressed as ML(1+4), meaning Mooney units recorded after 4 minutes of machine operation, following 1 minute of warm-up. A Mooney value generally about 40 to about 80 is preferred for ease of processing the rubber composition by conventional methods.

The Extrudability test is according to ASTMD-2230 using ASTM die #1 (Garvey type) with results reported according to Rating System B. Extrudate edges are rated from 1 through 10, with a value of 1 designating very uneven, ragged or torn edges and a value of 10 designating straight, sharp and smooth edges. Extrudate surfaces are rated from E through A with E designating uneven, broken or rough surfaces and A designating regular, smooth and glossy surfaces.

It is considered important that edge ratings be high, about 7 through 10, and that the surface rating be A (smooth) because lesser ratings would indicate difficulty in producing readily useable articles by conventional rubber processing methods.

It is considered that this Example demonstrates that the inclusion of the LDPE significantly improved the tear resistance for a natural rubber based rubber composition and, also, resistance to tear initiation and abrasive wear making it suitable for use in the preparation of various tire tread applications.

In contrast, the utilization of HDPE, while demonstrating a moderate improvement in tear and cut resistance for the rubber composition, nevertheless increases Mooney viscosity of the blend to an undesirably high level which is indicative of difficult processing characteristics.

It is also considered that the extrudability values for the LDPE/rubber blend demonstrates that there could be expected to be no substantial difference in extrudability between it and the control (Exp. A), as contrasted to the HDPE/rubber blend (Exp. C) for which extrudability values indicate very significant difficulty, or even practically an impossibility, of producing useable articles from the extrudate.

EXAMPLE II

A rubber blend is prepared of natural cis 1,4-polyisoprene rubber and emulsion polymerization prepared styrene/butadiene copolymer rubber together with an LDPE by forming a mixture thereof in the manner of Example I comprised of materials illustrated in the following Table 3 and of the types recited in the paragraphs and footnotes following Table 1, except where otherwise noted. Experiment D (Exp D) is considered a Control without the LDPE and Experiment E (Exp E) is considered to be an example of this invention.

TABLE 3

| Material | Parts | |
|---|---|---|
| | Exp D (Control) | Exp E |
| Natural rubber | 75 | 75 |
| SBR (1712 type) oil extended with 9.4 phr oil | 25 | 25 |
| LDPE[1] | 0 | 10 |
| Carbon Black (N-220 type) | 55 | 55 |
| Sulfur | 1.5 | 1.5 |

[1] An LDPE identified as Petrothene NA 940-000 and obtained from Quantum Chemical Corp.

The blends were cured at a temperature of about 150° C. for about 36 minutes.

The cured blends were observed to have properties shown in Table 4.

TABLE 4

| Property | Value | |
|---|---|---|
| | Exp D (Control) | Exp E |
| Tear at 120° C. (N) | 114 | 137 |
| Bridgestone pendulum cut depth (mm) | 13.3 | 13.0 |
| Hardness (Shore A) RT/100° C. | 62/59 | 66/58 |
| Abrasion (volume loss) | 181 | 151 |

It is considered that this Example demonstrates that the inclusion of the LDPE significantly improved the tear resistance for a natural rubber/SBR based rubber composition and, also, a resistance to tear initiation and abrasive wear making it suitable for use in preparation of various tire tread applications.

EXAMPLE III

A rubber blend is prepared of cis 1,4-polybutadiene rubber and emulsion polymerization prepared styrene/butadiene copolymer rubber together with an LDPE by forming a mixture thereof in the manner of Example I comprised of modifications illustrated in the following Table 5. Experiment F (Exp F) is considered a Control without the LDPE and Experiment G (Exp G) is considered to be an example of this invention.

TABLE 5

| Material | Parts | |
|---|---|---|
| | Exp F (Control) | Exp G |
| Polybutadiene rubber | 15 | 15 |
| SBR (1502 type) | 85 | 85 |
| LDPE | 0 | 15 |
| Carbon Black (N-299 type) | 60 | 60 |
| Sulfur | 1.5 | 1.5 |

The blends were cured at a temperature of about 150° C. for about 36 minutes.

The cured blends were observed to have the properties shown in Table 6.

TABLE 6

| Property | Value | |
|---|---|---|
| | Exp F (Control) | Exp G |
| Tear at 120° C. (N) | 99 | 114 |
| Bridgestone pendulum cut depth (mm) | 12.6 | 11.8 |
| Hardness (Shore A) RT/100° C. | 63/50 | 70/52 |
| Abrasion (volume loss) | 111 | 103 |

It is considered that this Example demonstrates that the inclusion of the LDPE moderately improved the tear resistance for a polybutadiene/emulsion SBR based rubber composition and, also, resistance to tear initiation and abrasive wear making it somewhat suitable for use in the preparation of various tire tread applications, although not as suitable as natural rubber based compositions.

While certain representative embodiments and details have been shown for the purpose of illustrating the invention, it will be apparent to those skilled in this art that various changes and modifications my be made therein without departing from the spirit or scope of the invention.

What is claimed is:

1. A pneumatic rubber tire having a sulfur cured, diene rubber-based thread which is comprised of a blend, based on 100 parts by weight of sulfur curable diene rubber-based elastomers, of (A) 100 parts by weight of at least one sulfur vulcanizable diene based rubber, and (B) about 5 to about 15 parts by weight low density polyethylene (LDPE) having a density of about 0.91 to 0.918 gm/cc, a melt index of about 0.2 to about 20 and a crystalline melt point in a range of about 104° C. to about 115° C. wherein the said LDPE is mixed with the said rubber at a temperature of about 120° C. to about 170° C. prior to sulfur vulcanizing the blend.

2. The tire of claim 1 where, in the tire tread, the diene rubber is natural cis 1,4-polyisoprene rubber.

3. The tire of claim 1 where, in the tire thread, the said blend is comprised of, based on 100 parts by weight rubber, (A) about 55 to about 90 phr of natural cis 1,4-polyisoprene rubber and, correspondingly, about 45 to about 10 phr of at least one synthetic rubber selected from polybutadiene rubber and styrene/butadiene copolymer rubber, and (B) about 5 to about 15 phr of said LDPE.

4. The tire of claim 1 wherein, in the tire tread, the said blend is comprised of, based on 100 parts by weight rubber, (A) about 10 to about 90 phr of cis 1,4-polybutadiene rubber and, correspondingly, about 90 to about 10 phr of styrene/butadiene copolymer rubber, and (B) about 5 to about 15 phr of said LDPE.

5. The tire of claim 1 where, in the tire tread, the diene rubber-based tread, in its uncured state, is characterized by having an extrudability edge value in a range of about 7 to about 10 and an extrudability surface value in a range of about A to about B according to ASTM Method D-2230, using ASTM die #1 and with results reported according to Rating System B.

* * * * *